(12) United States Patent
Siklosi (10) Patent No.: US 10,207,169 B2
(45) Date of Patent: Feb. 19, 2019

(54) CONNECTION SYSTEM FOR PUNCHING BAG TOP AND BASE

(71) Applicant: Century, LLC, Oklahoma City, OK (US)

(72) Inventor: Tibor Siklosi, Norman, OK (US)

(73) Assignee: Century, LLC, Oklahoma City, OK (US)

( * ) Notice: Subject to any disclaimer, the term of this patent is extended or adjusted under 35 U.S.C. 154(b) by 0 days.

(21) Appl. No.: 15/196,907

(22) Filed: Jun. 29, 2016

(65) Prior Publication Data

US 2018/0001176 A1 Jan. 4, 2018

(51) Int. Cl.
| F16B 1/00 | (2006.01) |
| F16B 2/08 | (2006.01) |
| A63B 69/20 | (2006.01) |
| A63B 71/02 | (2006.01) |
| F16B 2/00 | (2006.01) |

(52) U.S. Cl.
CPC .............. *A63B 69/208* (2013.01); *F16B 1/00* (2013.01); *F16B 2/08* (2013.01); *A63B 2071/026* (2013.01); *F16B 2001/0028* (2013.01)

(58) Field of Classification Search
CPC ........................................ A63B 69/20–69/345
See application file for complete search history.

(56) References Cited

U.S. PATENT DOCUMENTS

| 952,862 A | 3/1910 | Armstrong | |
| 2,037,508 A | 4/1936 | Gilman | |
| 2,197,545 A * | 4/1940 | Bachman | A63B 69/345 473/444 |
| 3,879,865 A | 4/1975 | Kimball | |
| 4,770,412 A | 9/1988 | Wolfe | |
| 5,307,908 A | 5/1994 | Shyr et al. | |
| 5,807,218 A | 9/1998 | Nagatomo | |
| 6,027,435 A | 2/2000 | Nadorf et al. | |
| 6,106,443 A * | 8/2000 | Kuo | A63B 69/34 482/83 |
| 6,390,958 B1 * | 5/2002 | Chu | A63B 69/20 482/83 |
| 6,790,167 B1 | 9/2004 | Carlin et al. | |
| 6,994,658 B2 | 2/2006 | Laudenslager et al. | |

(Continued)

OTHER PUBLICATIONS

International Search Report and Written Opinion from Corresponding PCT Patent Application PCT/US2017/039762 dated Oct. 11, 2017; Korean Intellectual Property Office.

*Primary Examiner* — Jennifer M Deichl
(74) *Attorney, Agent, or Firm* — Head, Johnson, Kachigian & Wilkinson, PC (57) ABSTRACT

A structurally unified free standing bag joined by its exterior skin to effectively absorb impact energy. The bag may comprise a foam top; a base with a rim and a channel below the rim, where the channel has a diameter smaller than a diameter of the rim; a cover, where the foam top attaches to the base via the cover; and a clamp assembly attached to the cover. The clamp assembly may have an open position and a closed position. The clamp assembly may have a diameter greater than the diameter of the rim when in the open position and smaller than the diameter of the rim when in the closed position, and the clamp assembly may be capable of being placed in the channel and secured in the closed position to attach the foam top to the base.

13 Claims, 8 Drawing Sheets

(56) References Cited

U.S. PATENT DOCUMENTS

| | | |
|---|---|---|
| 7,063,648 B1 | 6/2006 | Brigham |
| 7,226,398 B2 | 6/2007 | Fu |
| 7,297,092 B1 | 11/2007 | Gaynor |
| 7,357,760 B1 | 4/2008 | Rios |
| 8,376,916 B2 | 2/2013 | Tsakiris |
| 8,814,729 B2 | 8/2014 | Hartigan |
| 9,414,649 B1 * | 8/2016 | Siklosi .................. A44B 19/40 |
| 2005/0022307 A1 | 2/2005 | McClintock et al. |
| 2005/0187043 A1 | 8/2005 | Miller et al. |
| 2006/0019803 A1 | 1/2006 | Giaquinta et al. |
| 2010/0048363 A1 | 2/2010 | Gilberti et al. |
| 2011/0077134 A1 | 3/2011 | Smith |
| 2013/0017931 A1 | 1/2013 | Mechling |
| 2013/0331235 A1 | 12/2013 | Fields et al. |
| 2014/0066268 A1 * | 3/2014 | Hafeken, Sr. .......... A63B 69/20 |
| | | 482/85 |
| 2014/0221172 A1 | 8/2014 | Siklosi et al. |
| 2016/0059100 A1 | 3/2016 | Chen |
| 2016/0059101 A1 * | 3/2016 | Chen .................. A63B 69/208 |
| | | 482/85 |
| 2016/0356293 A1 * | 12/2016 | Dimitrov ........... A63B 21/0728 |

* cited by examiner

CONNECTION SYSTEM FOR PUNCHING BAG TOP AND BASE

CROSS REFERENCE

Not Applicable.

BACKGROUND OF THE INVENTION

Field of the Invention

This invention relates generally to an external/structural connection system for a punching bag top and base and more particularly, but not by way of limitation, to a free standing punching bag with a clamp assembly for retaining the bag on a base.

Description of the Related Art

Free standing training bags are an effective alternative to hanging heavy bags because they do not require mounting to overhead ceiling framing. Free standing bags are moveable, allowing users to remove the bag from the floor following each workout.

Free standing bags are typically comprised of two major components: 1) a heavily weighted plastic base, typically filled with sand or water, with a post or stem protruding upward from its center; and 2) a cylindrical foam top with a plastic cylinder centrally embedded in the foam. The foam is typically covered in a durable textile material. The foam top is mounted on the stem protruding upward from the weighted base via the plastic cylinder. In alternative embodiments, the cylindrically shaped foam top may be constructed with a plastic stem protruding from one end, which may be inserted into an opening in the center of a weighted base. In both construction methods, the weighted base and padded cylinder top are separate pieces joined mechanically at the center by a stem from one inserted into an opening in the other.

Free standing bags are generally vertically oriented and may stand between 4 and 6 feet tall and are generally constructed on a heavily weighted base. Free standing punching bags must endure punches and kicks from combat sports athletes. Impact forces generated during use are received at the padded exterior of the padded bag top and impact energy is transferred to a plastic center post positioned at the axis of the free standing bag. The plastic post is generally centrally mounted upon the weighted base. Weight contained within the base provides resistance to kicks and punches, which act laterally upon the bag top and post. The weight within the base generally acts to keep the punching bag uptight during use, while impact energies received by the post forcibly tip the base. The axially located stem and base connection point often fails to endure these load transfers over e before catastrophic failures are realized.

Another embodiment of the free standing bag design connects, or removably connects, a weighted or fixed base to an air filled top for punching. However, these designs fail to generate the resistance desirable in punching bags.

Based on the foregoing, it is desirable to provide a free standing punching bag that eliminates the concentration of impact loads acting solely upon a centrally located internal plastic component. It would be ideal to disperse impact loads across a broader structural area to reduce load stresses acting on components. It is also critical to meet these objectives while maintaining resistance characteristic of punching bags.

SUMMARY OF THE INVENTION

In general, in a first aspect, the invention relates to a punching bag comprising: a foam top with a top, a bottom, and at least one side; a base with a rim and a channel below the rim, where the channel has a diameter smaller than the rim; a cover, where the top attaches to the base via the cover; and a clamp assembly attached to the cover, where the clamp assembly has an open position and a closed position, where the clamp assembly has a diameter greater than the rim when in the open position and smaller than the rim when in the closed position, and where the clamp assembly is capable of being placed in the channel and secured in the closed position to attach the top to the base.

The clamp assembly may comprise one or more arcs attached to and extending downward from the cover, where each arc has a first end and an opposed second end; the one or more arcs are aligned with each first end adjacent to a second end to form a circle or a segmented circle; and the one or more arcs are flexibly connected to the cover such that the one or more arcs are capable of being bent outward. The clamp assembly may further comprise one or more tabs, where a tab is connected to the first end of each arc and each tab is removably attachable to the second end adjacent the first end to which the tab is attached, such that the one or more tabs are capable of connecting the one or more arcs to form a circle with a fixed diameter, securing the clamp assembly in the closed position. Each tab may be removably attachable to its corresponding second end via hook and loop material. Each arc may comprise a flexible tube filled with a relatively rigid material, where the relatively rigid material is rigid relative to the flexible tube.

The cover may at least partially compress the foam top. The top may further comprise a hollow cylinder with a hollow interior, where the hollow cylinder is coaxial with the top, where the hollow cylinder has a smaller diameter than the top such that the hollow cylinder is laterally surrounded by foam, and where the hollow cylinder extends to the bottom of the top such that the interior of the hollow cylinder is accessible from outside the top. The hollow cylinder may have a top and a bottom and the hollow cylinder may not extend to the top of the top, such that the foam covers the top of the hollow cylinder. The base may have an upwardly protruding post, where the post is receivable in the hollow cylinder of the top. The cover may cover the top and side of the top, but not the bottom of the top. The cover may have a lower end that extends beyond the bottom of the top, where the clamp assembly is attached to the lower end.

In a second aspect, the invention relates to a method of constructing a punching bag, the method comprising: placing a foam top within a cover, where the foam top has a top, a bottom, and at least one side, where the cover covers the top and side of the foam top and where the cover has a lower end that extends beyond the bottom of the top and a clamp assembly with an adjustable circumference attached to the lower end of the cover; placing the foam top atop a base such that the bottom of the top abuts a top of the base; lowering the clamp assembly over a rim projecting radially from the base and into a channel in the base located below the rim, where the channel has a smaller circumference than the rim; reducing the circumference of the clamp assembly such that it is smaller than the circumference of the rim; and locking the clamp assembly such that the circumference of the clamp assembly is fixed.

The method may further comprise at least partially compressing the foam top prior to placing the foam top within the cover, where the cover has a smaller diameter than the foam top in a non-compressed state such that the foam top remains in an at least partially compressed state after being placed within the cover. Lowering the clamp assembly over the rim of the base may further comprise at least partially compressing the foam top against the top of the base. The top may further comprise a hollow cylinder with a hollow interior, where the hollow cylinder is coaxial with the top, where the hollow cylinder has a smaller diameter than the top such that the hollow cylinder is laterally surrounded by foam, and where the hollow cylinder extends to the bottom of the top such that the interior of the hollow cylinder is accessible from outside the top. The base may have an upwardly protruding post, where the post is receivable in the hollow cylinder of the top, and placing the foam top atop a base may further comprise placing the post of the base within the hollow cylinder of the top. The method may further comprise increasing the circumference of the clamp assembly to fit over the rim of the base prior to lowering the clamp assembly over the rim.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a new free standing punching bag with a base retention system, as shown in FIGS. 1 through 8, and a method of constructing the same that may improve impact energy management.

Figure 1:
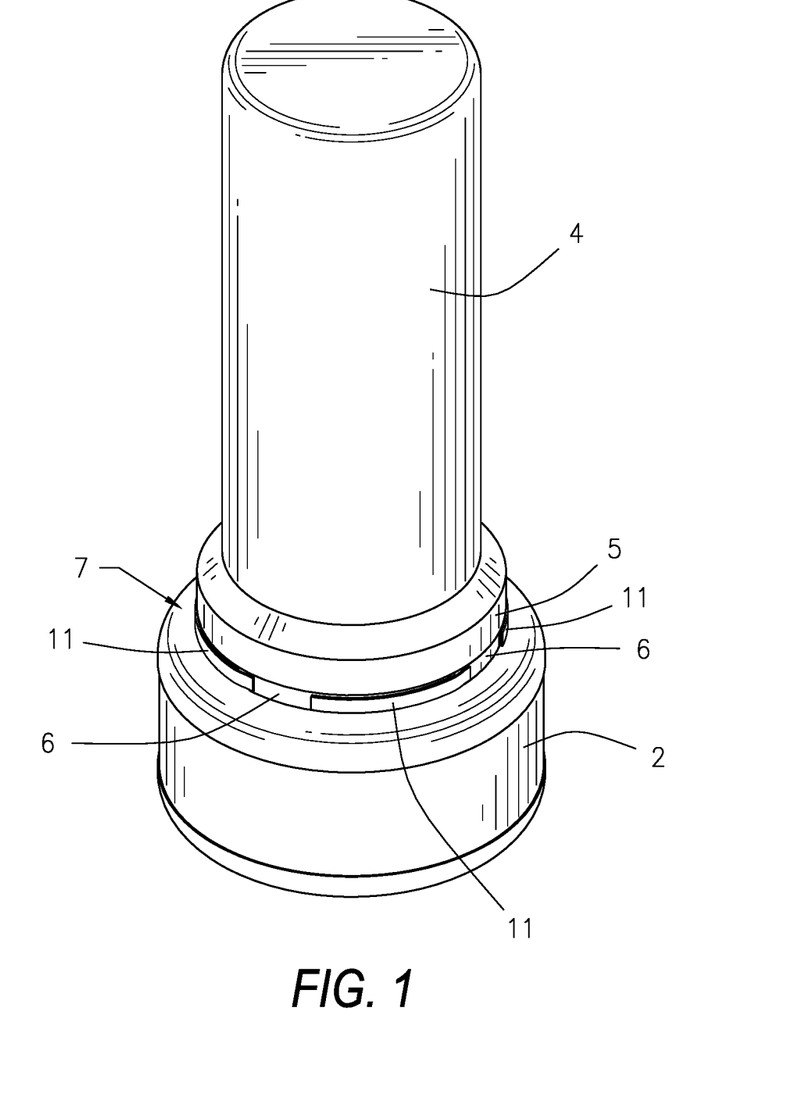
FIG. 1 is a perspective view of the punching bag of the present invention.
Figure 2:
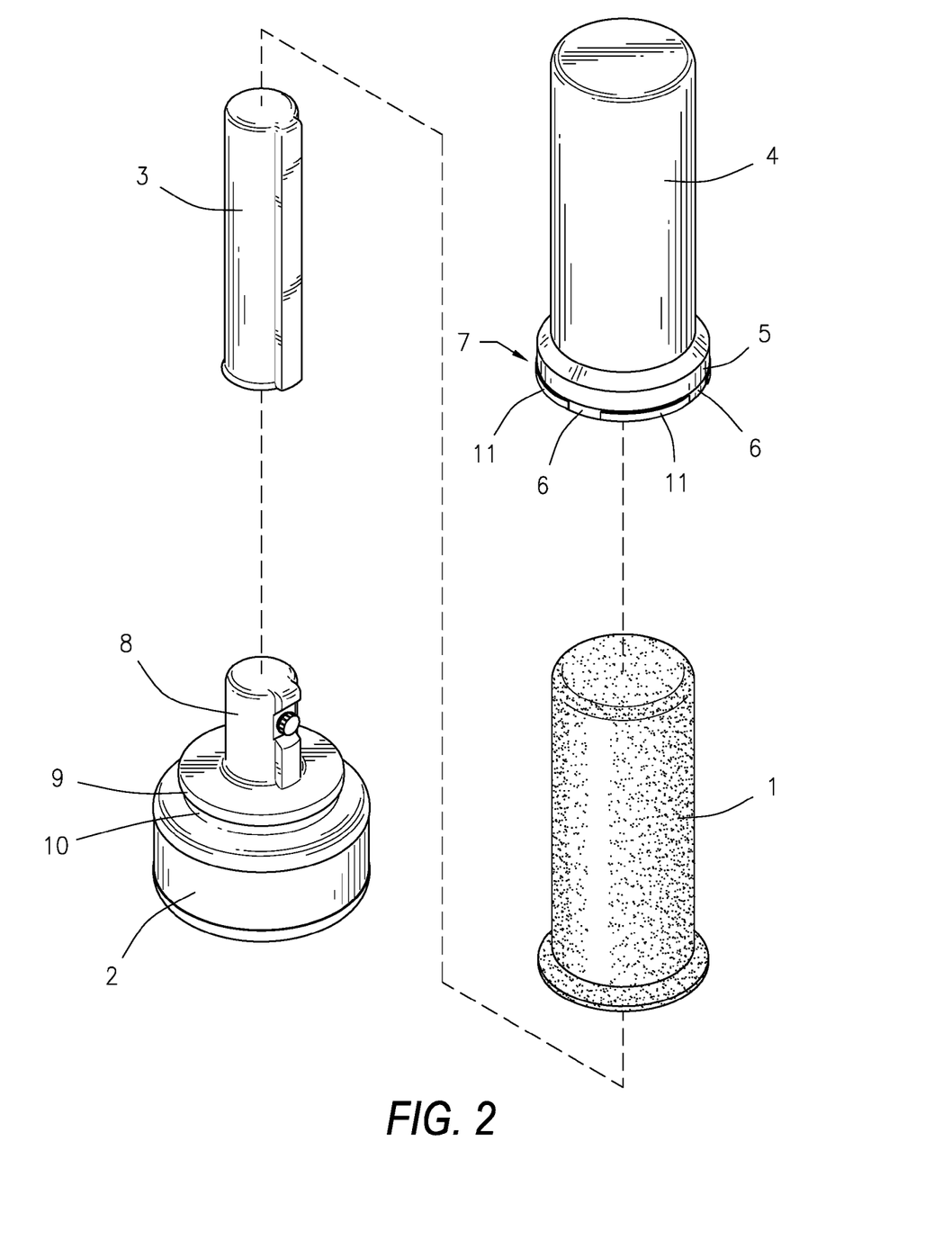
FIG. 2 is an exploded view of the punching bag.
Figure 3:
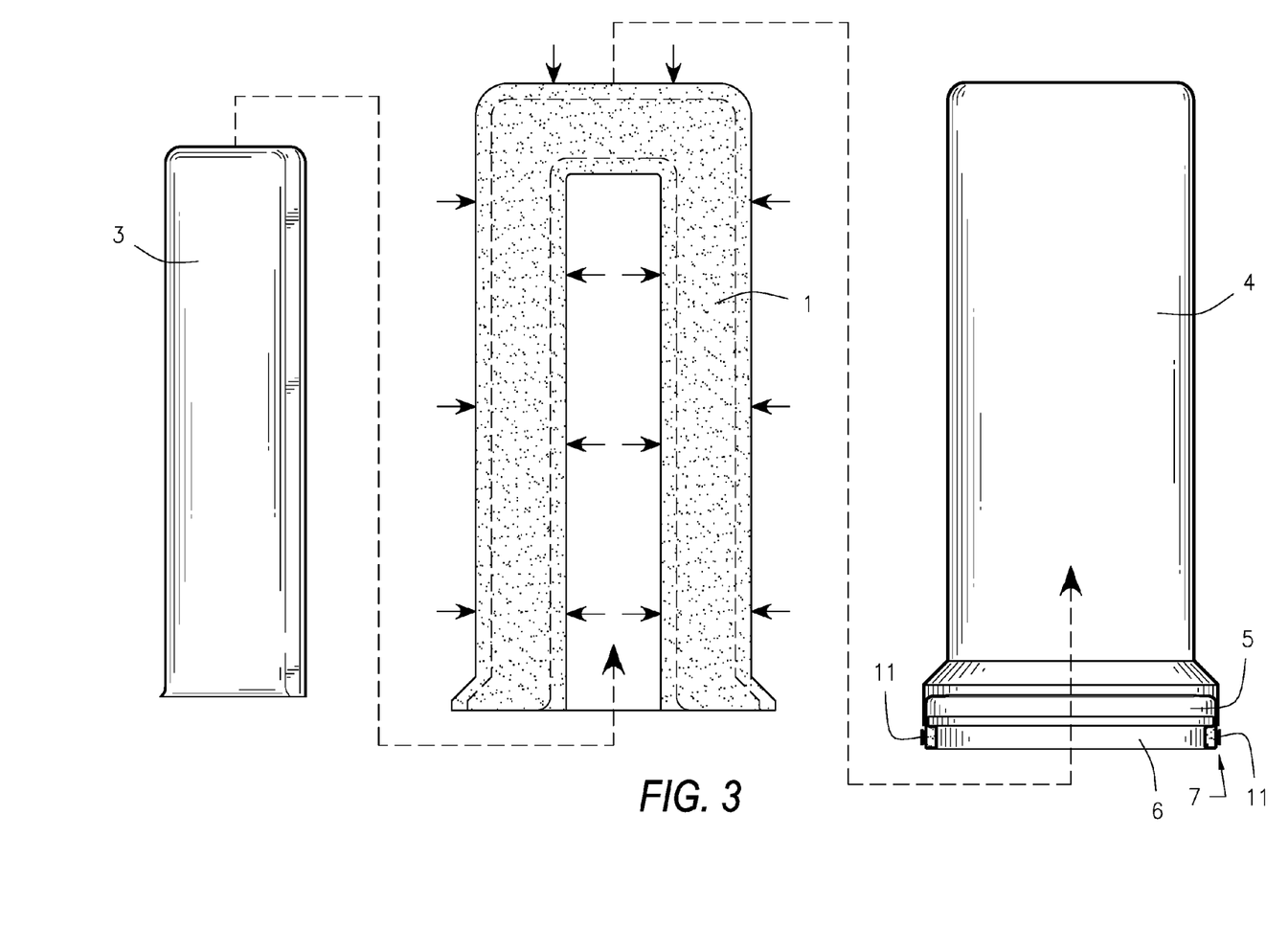
FIG. 3 is an exploded, partial cross section view of the punching bag top.
Figure 4:
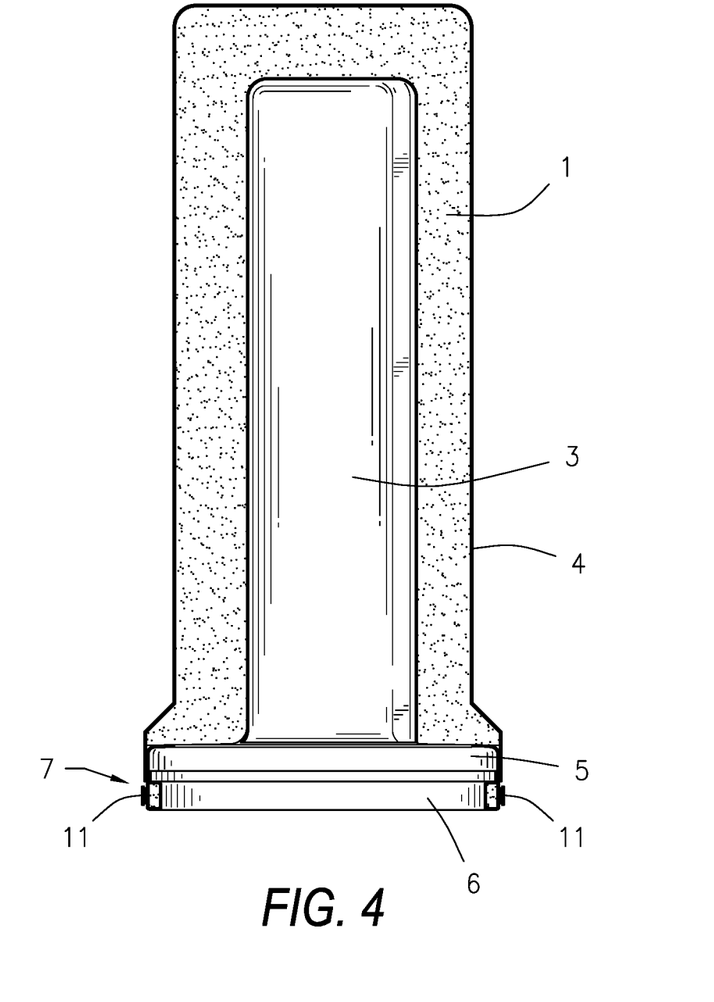
FIG. 4 is a cross-sectional view of the punching bag top.

The free standing punching bag may comprise a top 1 and a base 2. The top 1 may be generally cylindrical and made of foam. Optionally, the top 1 may have a hollow cylinder 3 at its center. The cylinder 3 may be plastic and may extend to the bottom of the top 1, such that the hollow interior of the cylinder 3 may be accessible from the bottom of the top 1. The cylinder 3 may extend to the top of the top 1, or may terminate below the top of the top 1 such that the top of the top 1 is just foam, as shown in FIG. 3. As much of the top 1 may be cylindrical foam without the center cylinder 3 as desired. For example, the cylinder 3 may extend ¾ of the height of the top 1, with the top ¼ of the top 1 just foam without the cylinder 3, as shown. Alternately, the cylinder 3 may extend ⅔, ½, ⅓, or ¼ of the height of the top 1, or any other desired portion of the top 1, with cylindrical foam without a center cylinder making up the remaining portion of the top 1.

While the top 1 and the cylinder 3 are described as cylindrical, either or both may be elongate with any cross sectional shape, such as circular, ellipsoid, oval-shaped, triangular, square, rectangular, pentagonal, hexagonal, heptagonal, octagonal, other polygonal, or any other shape, as desired. For example, the top 1 may be generally cylindrical, but may flare outward at its bottom, as shown.

The top 1 may be covered on its sides and top with a cover 4, which may be a durable textile material, such as vinyl. The top 1 may not be covered on its bottom, as shown, or may be covered with a cover separate from the cover 4. When the punching bag is assembled, the cover 4 may not completely or even substantially cover the base 2. The cover 4 and the cylinder 3 may be sized appropriately to at least partially compress the foam of the top 1, as shown in FIG. 3. For example, if the foam of top 1 has a particular diameter in a relaxed state, the cover 4 may have a diameter less than the diameter of the foam. Thus, to fit within the cover 4, the foam must be maintained in an at least partially compressed state. Likewise, if the foam of top 1 has a particular inside diameter in a relaxed state, the cylinder 3 may have a diameter greater than the inside diameter of the foam. Thus, for the cylinder 3 to fit within the top 1, the foam must be maintained in an at least partially compressed state. The degree to which the diameter of the foam in its relaxed state and the diameter of the cover 4 differs and the degree to which the inside diameter of the foam in its relaxed state and the diameter of the cylinder 3 differs, and consequently the degree of compression, may depend on the desired rebounding characteristics of the punching bag. By way of example, FIG. 3 shows the foam of top 1 in a relaxed state, with the degree of compression required to insert the cylinder 3 therein and to fit the cover 4 thereover shown in dashed lines, with compressive forces indicated by arrows. The length of the cover 4 from its top to the point where it joins the base 2 may similarly be shorter than the height of the foam of the top 1, such that the foam must compress when the top 1 is joined to the base 2. Again, the height difference, and consequently the degree of vertical compression of the foam, may depend on the desired rebounding characteristics of the punching bag.

The lower end 5 of the cover 4 may extend beyond the bottom of the top 1. This lower end 5 may be part of the cover 4 or may be a separate element attached to the cover 4. A clamp assembly 7 may be attached to the lower end 5. Alternately, the lower end 5 may be incorporated into the clamp assembly 7. For example, the lower end 5 may comprise excess material folded into a hem, and the clamp assembly 7 may include one or more elements held within the hem, such as a hoop with an adjustable circumference, such that the circumference may be increased or decreased as desired and locked into place such that the desired circumference is maintained, or a hoop with an opening such that the hoop may be deformed and opened temporarily and then closed to maintain its usual circumference.

As shown in the figures, the clamp assembly 7 may comprise one or more arcs 6 attached to and extending downward from the end 5. The one or more arcs 6 may be removably joined together by one or more tabs 11. Each arc 6 may have a first end 12 and an opposed second end 13. The one or more arcs 6 may be aligned with each first end 12 adjacent to a second end 13. Each first end 12 may touch the adjacent second end 13 to form a circle, or each first end 12 may be aligned with but not touching the adjacent second end 13 to form a segmented circle. If the clamp assembly 7 comprises only one arc 6, the first end 12 and the adjacent second end 13 are the two ends of the one arc 6. If the clamp assembly 7 comprises more than one arc 6, each first end 12 is adjacent the second end 13 of a different arc 6. Each arc 6 may be arced, such that it forms a segment of a circle, or may be straight or any other desired shape.

Figure 5:
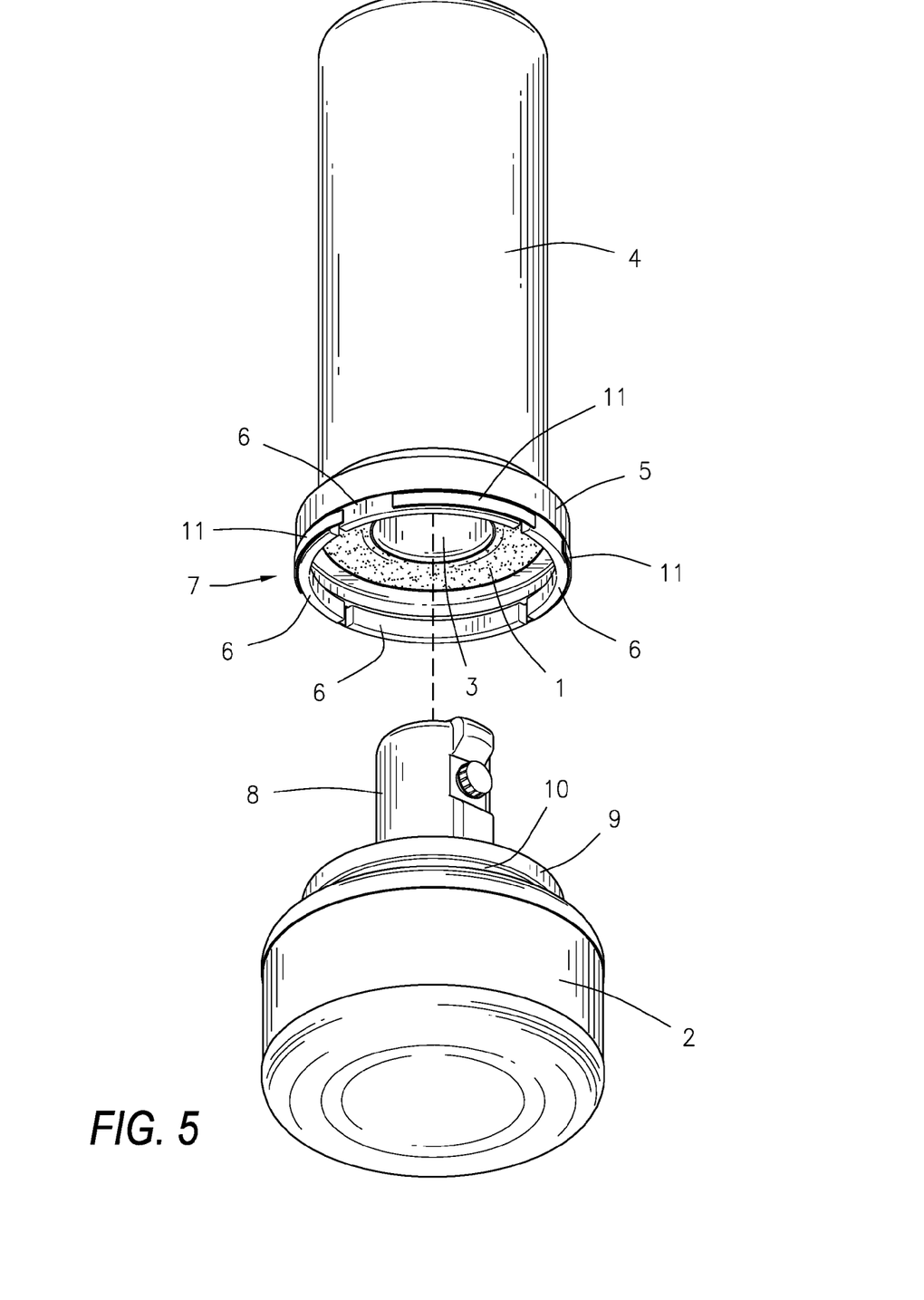
FIG. 5 is a perspective view of the punching bag prior to installation of the top on the base.
Figure 6:
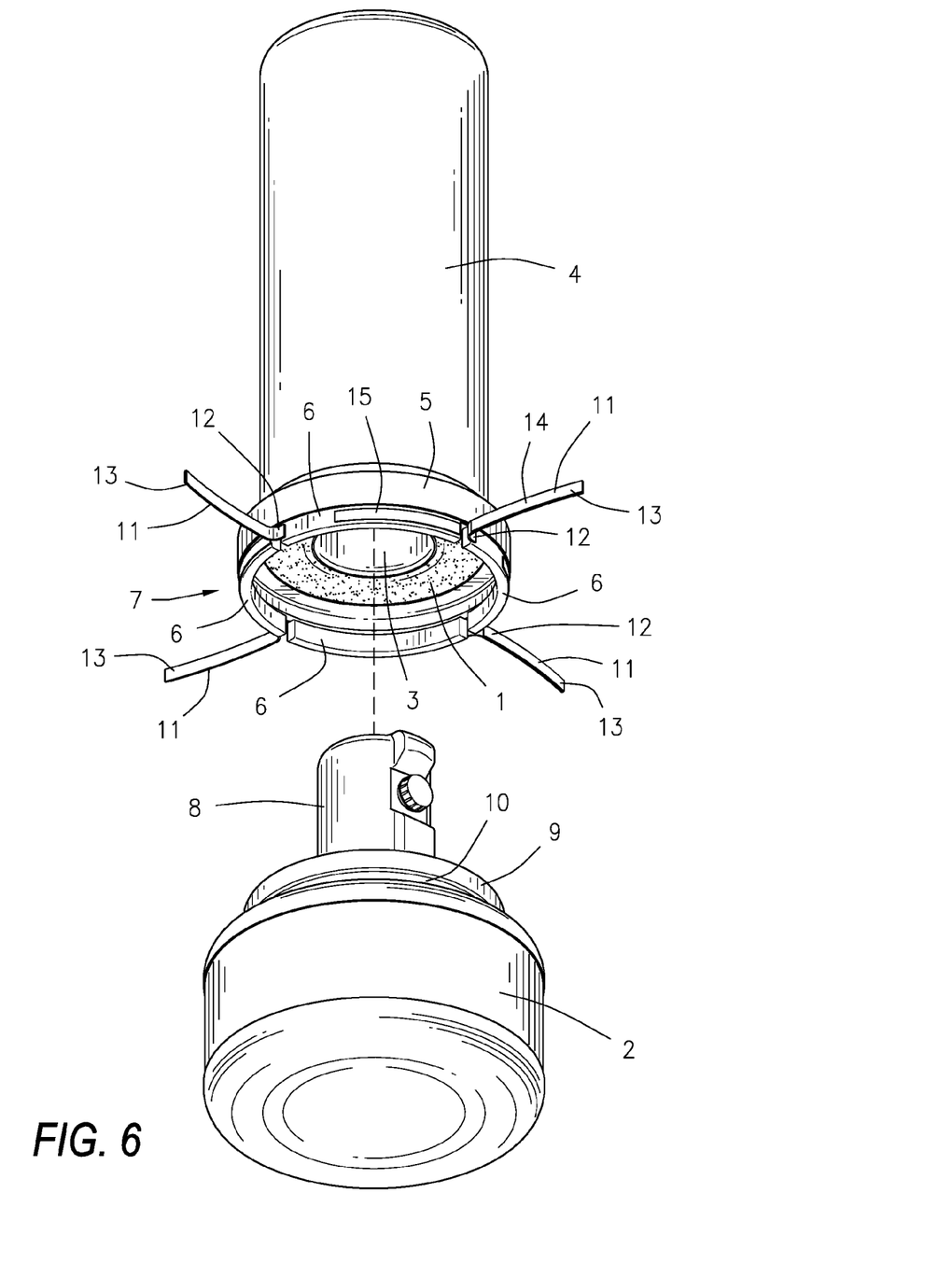
FIG. 6 is perspective view of the punching bag prior to installation of the top on the base, with the clamp assembly in an open position.
Figure 7:
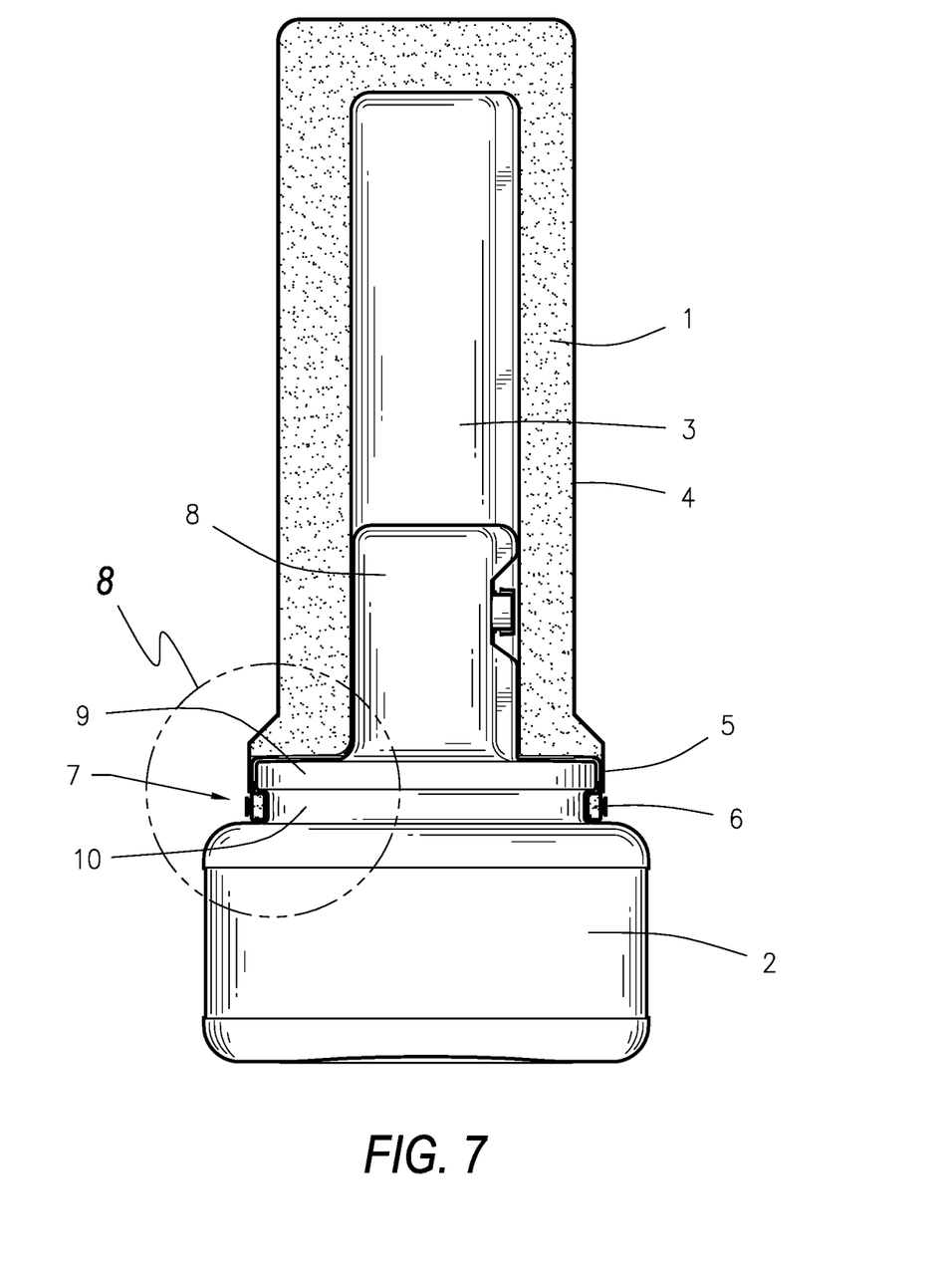
FIG. 7 is a cross-sectional view of the punching bag.

If the clamp assembly 7 comprises one arc 6, it may have a tab 11 attached to its first end 12, where the tab 11 removably attaches to the second end 13 such that the arc 6 and the tab 11 form a circle. If the clamp assembly 7 comprises more than one arc 6, each arc 6 may have a tab 11 attached to its first end 12, where the tab 11 removably attaches to the second end 13 of the next arc 6 such that the arcs 6 and the tabs 11 form a circle. FIG. 5 shows the clamp assembly 7 with four arcs 6 and four tabs 11 with the tabs 11 closed, thus forming a circle, while FIG. 6 shows the tabs 11 open. The first ends 12 and second ends 13 are identified on FIG. 6. The tabs 11 may removably attach to the second ends 13 via any desired removable attachment device or devices. For example, the figures show the tabs 11 attached to the second ends 13 via hook and loop material, with an area 14 of either hook or loop material on the tabs 11 and a corresponding area 15 of either hook or loop material on the second ends 13. If area 14 is hook material, area 15 may be loop material, and if area 14 is loop material, area 15 may be hook material. Alternately, areas 14 and 15 may be any other type of joinable material or may comprise any other desired attachment devices.

Figure 8:
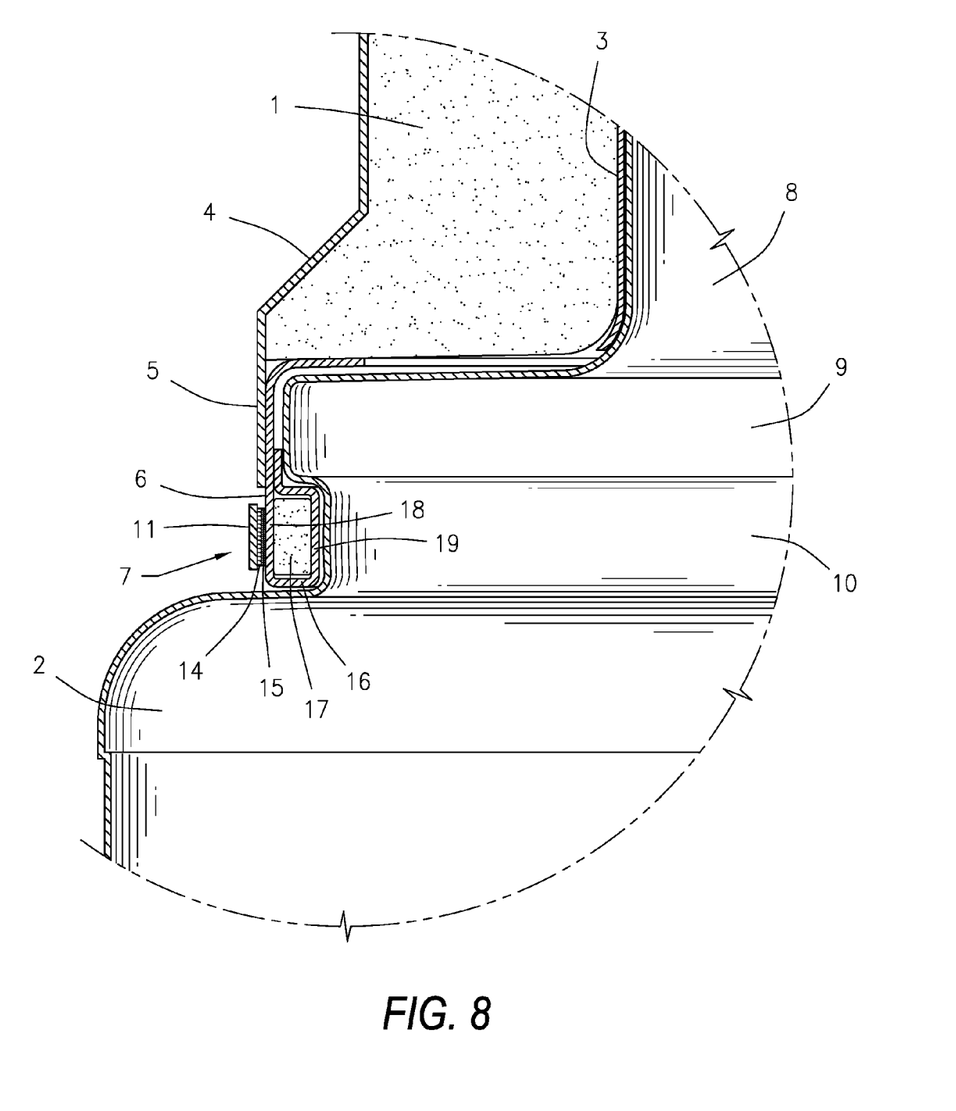
FIG. 8 is a close-up cross-sectional view of the punching bag with the clamp assembly closed in place on the base.

The arcs 6 may be at least partly formed of flexible material, such as the same vinyl forming the cover 4. Thus, the arcs 6 may be bent outward and upward along their edge of attachment to lower end 5 during installation of the top 1 on the base 2. The arcs 6 may additionally comprise at least one area of relatively rigid material, where the relatively rigid material is more rigid than the flexible material. The relatively rigid material may also be rigid in an absolute sense, or may be somewhat flexible, although less flexible than the flexible material. For example, the arc 6 may be flexible material folded and secured to form a channel 16, as shown in FIG. 8. The channel 16 may be filled with relatively rigid material 17, such as dense foam or plastic. The channel 16 may have an outer wall 18 and an outer wall 19. When the tabs 11 are in place and the arcs 6 form a circle or a segmented circle, the outer walls 18 may generally align with the lower end 5 the inner walls 19 may form a circle/segmented circle with a smaller diameter than the lower end 5.

The clamp assembly 7 may be capable of being secured such that its circumference, once closed or locked, can withstand a certain amount of force and cannot be increased by force without again proactively opening the clamp assembly 7. The clamp assembly 7 may be made of fabric such as nylon, polyester webbing, plastic, rubber polymers, metal, metal binding, cables, cords, straps, any other material, or any combination thereof. The clamp assembly 7 may be closed and/or secured by hook and loop material, snaps, levers, rope, cords, screws, bolts, any other closure device, or any combination thereof.

The base 2 may be plastic and may be at least partially hollow such that it may be at least partially filled with weight, such as sand and/or water, to a user's desired level of resistance. Optionally, the base 2 may be permanently at least partially filled with weight, such as sand and/or water. The base 2 may have a diameter greater than the diameter of the top 1, thereby providing a low center of gravity to the punching bag to increase resistance to tipping over. The base 2 may have a post 8 protruding upward from its center. The post 8 may be receivable in the cylinder 3 of the top 1.

The base 2 may have a rim 9 near its top, with an indented channel 10 adjacent and just below the rim 9. Both the rim 9 and the channel 10 may extend around the entire circumference of the base 2. The rim 9 may have a diameter less than that of the base 2 as a whole. The rim 9 and channel 10 may be any desired size with any desired dimensions. For example, the rim 9 and channel 10 may each be 2 inches tall, with the channel 10 recessed ¾ inch. The depth of the channel 10 may be sufficient to provide sufficient interference necessary to retain the clamp assembly 7 in the channel 10. The necessary interference differential may change depending on the material used in the clamp assembly 7. For example, a material with higher ensile elasticity may require a deeper channel 10 than a material such as steel banding. The location of the channel 10 may be anywhere along the height of the base 2, although it is most desirable for the channel 10 to be located nearer the top of the base 2.

The clamp assembly 7 of the top 1 may be receivable in the channel 10 when the top 1 is mounted on the base 2. The rim 9 may have a circumference less than the greatest possible circumference of the clamp assembly 7 and greater than the least possible circumference of the clamp assembly 7. Thus, the clamp assembly 7 may be adjusted to have a circumference greater that the rim 9, the clamp assembly 7 may be lowered over the rim 9 and into the indented channel 10, and then the clamp assembly 7 may be adjusted to have a circumference less than the rim 9. The clamp assembly 7 may be fastened closed, fixing the circumference less than the rim 9 and thus securing the clamp assembly 7 within the channel 10. The top 1 may thereby be effectively secured to the base 2 by interference fit because the axial length of the clamp assembly 7 is less than the axial length of the upper rim of the base.

For example, as shown in the figures and described above, the tabs 11 may be detached from the second ends 13 of the arcs 6 and the arcs 6 may be bent outwards, thus increasing the circumference of the segmented circle formed by the arcs 6. The top 1 may be placed with the cylinder 3 over the post 8 and the foam of top 1 may be compressed against the base 2 to bring the lower end 5 over the rim 9. The arcs 6 may fit within the channel 10, and the tabs 11 may be secured to the second ends 13 to maintain the arcs 6 within the channel 10. Thus, the arcs 6 may form a circle or segmented circle with a diameter smaller than that of the rim 9, forcing the top 1 to stay in place on the base 2.

In this state the foam top 1 assembly may be secured to the base 2 and may introduce functional and structural advantages unique to this invention. In particular, the axial strength of the clamp assembly 7 may secure the arcs 6 inside the channel by interference fit. In this condition, forces may act upon the total circumferential strength of the clamp assembly 7 and simultaneously act upon the weighted base 2 to which it is secured. Therefore, the point of kinetic energy impact dispersal may start at the surface of cover 4, whereas, in the case of traditionally constructed bags, the duty of kinetic energy dispersal is left entirely to the plastic center post 8. This may provide a greater structural surface area, as the cover 4 has a much greater surface area than the post 8, and a greater contact area joining the top 1 to the base 2, as the clamp assembly 7 has a greater circumference than the post 8.

The top 1 may be made of foam compressed within the cover 4, which may be secured to the base 2 by the clamp assembly 7. The compressed bag top 1 may be further compressed on all sides or hydrostatically when clamped to the weighted base 2. This connection may compress the foam and increase tension on the cover 4 to generate tensile stability and carry load bearing functions as part of the bag structure. Compressed foam tends to resist permanent volume deformation, and therefore the pressure volume characteristics of the cover 4 are a permanent effect. The resulting structural tension arising from the foam's elastic energy may be captured and converted to a structural element capable of transferring impact energy to the base 2, and resistance of the base 2 back to the user.

The cover 4 may be under tension to be an impact load bearing element. Therefore, a greater amount of kinetic energy dispersal may begin at the bag's perimeter rather than the center plastic post 8. Consequentially, as the bag receives impact energy, the continuous outer surface may collectively share resistance while transferring energy uniformly to the circumferential perimeter rim 9 of the base 2. Thus the whole assembly, including the cover 4, foam of top 1, post 8, and base 2 may share the role of impact energy management. As a result of this connection method, the bag may not rely exclusively upon an internal plastic structure to manage the dispersal of kinetic impact energies.

Interference pressures between the clamp assembly 7 and weighted base 2 may connect the top and bottom, vertically compressing the foam, to generate structural tension. Connecting the top 1 to its base 2 at the outermost circumference, rather than the center, may incorporate mechanical leverage to effectively absorb impact while dispersing loads across a broader surface area. The cover 4 may induce tensile stability at the perimeter where mechanical leverage is more favorable.

This invention leverages the principle of stored energy of position because the weighted base resistance increases axial, radial, and tensile strength of the system. Impact energy acting upon the bag may engage the resistance of the weighted base, which converts stored energy to increase tensile structural stability of the system. The cover 4 hydrostatically compresses the foam of top 1 while uniting the top 1 to the base 2, causing the cover 4 to be under pressure, producing tensile stability and enabling the top 1 to readily engage the desired resistance from the weighted base. Joining the top 1 to the base 2 by the cover 4, farthest from the axis, along its circumference may maximize contact at the connection surface and may most effectively unify the free standing bag assembly.

This energy dispersal system may allow the use of a shorter base post and bag cylinder. The shorter post in conjunction with shorter bag cylinder may provide an optimal amount of cushioning for the user while promoting a higher quality and lasting product.

The textile material may be pre-stressed and connected to generate mechanical stability and linear and non-linear structural strength. Horizontally, the skin of the bag may use the cylindrical geometry and naturally occurring circumferential stress, or hoop strength, to secure the top and bottom. Vertically, the skin of the bag may be pre-stressed to create tensile stability while securing the top and bottom. By combining the phenomenal effects of hoop stress and tensile stability from compression as described, this invention may generate mechanical leverage to establish a unified free standing bag system.

The free standing punching bag with a base retention system may be constructed by inserting the cylinder 3 into the foam top 1, at least partially compressing the foam top 1, inserting the foam top 1 into the cover 4 such that the foam top 1 remains at least partially compressed, placing the post 8 inside the cylinder 3, increasing the circumference of the clamp assembly 7 to fit over the rim 9 of the base 2, bringing the clamp assembly 7 down over the rim 9 into the channel 10 of the base 2, simultaneously at least partially compressing the foam top 1 against the top of the base 2, decreasing the circumference of the clamp assembly 7 to secure it within the channel 10 such that it cannot move upward over the rim 9, and closing the clamp assembly 7 to fix the circumference so that upward force of the cover 4 will not cause the circumference of the hoop clamp 7 to increase. Any of these steps may be omitted as needed or desired, based on the goals of the user and the properties of the punching bag. For example, the foam top 1 may not be at least partially compressed against the top of the base 2 if the length of the cover 4 from its top to the point where the top 1 joins the base 2 is not shorter than the height of the foam top 1 in a non-compressed state. Likewise, the circumference of the clamp assembly 7 may not need to be increased to fit over the rim 9 of the base 2 if it already has a sufficient circumference to fit over the rim 9.

Whereas, the devices and methods have been described in relation to the drawings and claims, it should be understood that other and further modifications, apart from those shown or suggested herein, may be made within the spirit and scope of this invention.

What is claimed is:

1. A punching bag comprising:
    a foam top with a top, a bottom, and at least one side, the foam top further comprising a hollow cylinder with a hollow interior, where:
        the hollow cylinder is coaxial with the foam top;
        the hollow cylinder has a smaller diameter than the foam top such that the hollow cylinder is laterally surrounded by foam; and
        the hollow cylinder extends to the bottom of the foam top;
    a base with a top, a rim, and a channel below the rim, where the channel has a diameter smaller than a diameter of the rim, where the base is capable of resting on a flat surface, the base further comprising a post having a first end mounted to the top of the base and a second end protruding upward from the top of the base, where the post is receivable in the hollow cylinder of the foam top and where the foam top has a height and the post has a height less than half the height of the foam top;
    a cover, where the foam top attaches to the base via the cover and where the cover at least partially compresses the foam top; and
    a clamp assembly attached to the cover, where the clamp assembly has an open position and a closed position, where the clamp assembly has a diameter greater than the diameter of the rim when in the open position and smaller than the diameter of the rim when in the closed position, and where the clamp assembly is capable of being placed in the channel and secured in the closed position to attach the foam top to the base such that the cover is under tension,
    where the combination of the foam top being compressed within the cover and the clamp assembly securing the cover to the base under tension provides kinetic energy dispersal at the bag's surface.

2. The punching bag of claim 1 where the clamp assembly comprises:

one or more arcs attached to and extending downward from the cover, where:
  each arc has a first end and an opposed second end;
  the one or more arcs are aligned with each first end respectively adjacent to each opposed second end to form a circle or a segmented circle; and
  the one or more arcs are flexibly connected to the cover such that the one or more arcs are capable of being bent outward;
one or more tabs, where:
  each tab is respectively connected to the first end of each arc; and
  each tab is removably attachable to the opposed second end of the arc adjacent the first end of the arc to which the tab is attached, such that the one or more tabs are capable of connecting the one or more arcs to form a circle with a fixed diameter, securing the clamp assembly in the closed position.

3. The punching bag of claim 2 where each tab is removably attachable to its corresponding second end via hook and loop material.

4. The punching bag of claim 2 where each arc comprises a flexible tube filled with a material which is rigid relative to the flexible tube.

5. The punching bag of claim 1 where the hollow cylinder is above the base and rests atop the base but is not secured to the base.

6. The punching bag of claim 1 where the hollow cylinder has a top and a bottom and where the hollow cylinder does not extend to the top of the foam top, such that the foam covers the top of the hollow cylinder.

7. The punching bag of claim 1 where the cover covers the top and side of the foam top.

8. The punching bag of claim 7 the cover does not cover the bottom of the foam top.

9. The punching bag of claim 1 where the cover has a lower end that extends beyond the bottom of the foam top, where the clamp assembly is attached to the lower end.

10. A method of constructing a punching bag, the method comprising:
  placing a foam top within a cover, where the foam top has a top, a bottom, and at least one side, the foam top further comprising a hollow cylinder with a hollow interior, where:
    the hollow cylinder is coaxial with the foam top;
    the hollow cylinder has a smaller diameter than the foam top such that the hollow cylinder is laterally surrounded by foam; and
    the hollow cylinder extends to the bottom of the foam top,
  where the cover covers the top and side of the foam top and at least partially compresses the foam top and where the cover has a lower end that extends beyond the bottom of the foam top and a clamp assembly with an adjustable circumference attached to the lower end of the cover;
  placing the foam top atop a base, where the base comprises a post having a first end mounted to the too of the base and a second end protruding upward from the top of the base and where the post has a height less than half the height of the foam top, such that the bottom of the foam top abuts a top of the base and the post is received in the hollow cylinder, where the base is capable of resting on a flat surface;
  attaching the foam top to the base via the cover such that the cover is under tension, comprising:
    lowering the clamp assembly over a rim projecting radially from the base and into a channel in the base located below the rim, where the channel has a smaller circumference than a circumference of the rim;
    reducing the circumference of the clamp assembly such that it is smaller than the circumference of the rim; and
    locking the clamp assembly such that the circumference of the clamp assembly is fixed;
  where the combination of the foam top being compressed within the cover and the clamp assembly securing the cover to the base under tension provides kinetic energy dispersal at the bag's surface.

11. The method of claim 10 further comprising at least partially compressing the foam top prior to placing the foam top within the cover, where the cover has a smaller diameter than a diameter of the foam top in a non-compressed state such that the foam top remains in an at least partially compressed state after being placed within the cover.

12. The method of claim 10 lowering the clamp assembly over the rim of the base further comprises at least partially compressing the foam top against the top of the base.

13. The method of claim 10 further comprising increasing the circumference of the clamp assembly to fit over the rim of the base prior to lowering the clamp assembly over the rim.

* * * * *